No. 859,071. PATENTED JULY 2, 1907.
E. KEMPSHALL.
TIRE.
APPLICATION FILED MAY 8, 1906.
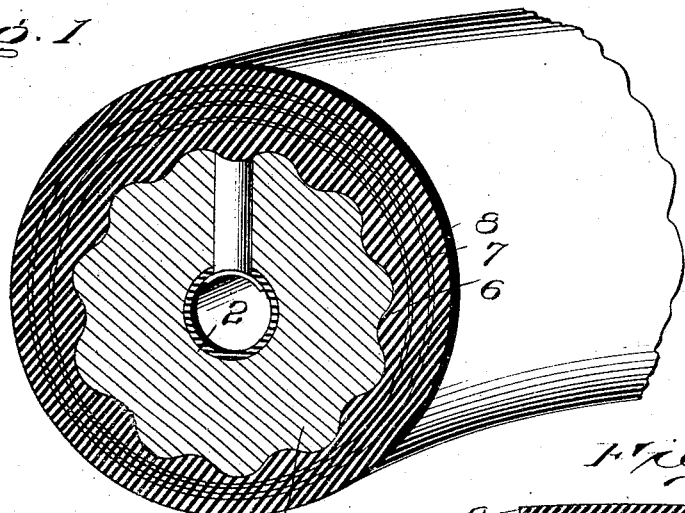
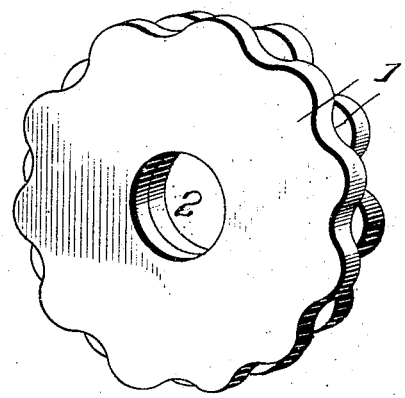
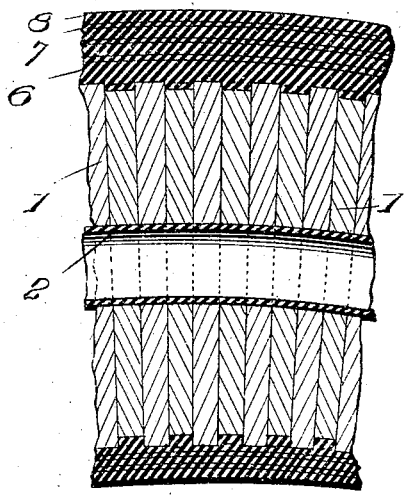
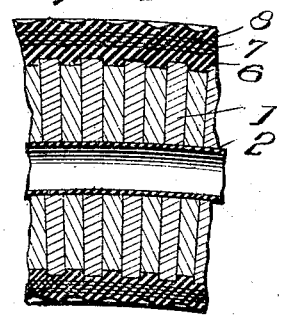
Witnesses
A. B. Williams
E. Bradley
Inventor
E. Kempshall
By ........ Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,071.      Specification of Letters Patent.      Patented July 2, 1907.

Application filed May 8, 1906. Serial No. 315,809.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in tires composed of transversely arranged sections of relatively non-resilient material, incased in a resilient cover.

In the organization of my improved tire I utilize such material as leather for the sections, and then incase them in a resilient cover, reinforced, as by fabric or like material.

To prevent the sections forming the tire becoming laterally displaced, I flute or roughen the edges to provide a plurality of depressions in which the rubber of the cover is embedded, as will hereafter appear.

In the drawings—Figure 1 is a perspective section of a portion of my improved tire. Fig. 2 is a detail vertical section of the tire. Fig. 3 is a detail view of several of the leather sections from which the body of the tire is constructed. Fig. 4 is a view illustrating the cover depressed into the depressions formed by the sections, to roughen the tire.

The numeral 1, indicates a series of sections of leather or like material, each formed with an opening 2, and having its edge fluted or roughened. The sections are cemented together, the projections on the edge of one section being between the projections on the edge of the adjacent section, while the openings of all the sections register. When assembling the sections it is not essential that the exact relationship of the projections and depressions be maintained as it is evident the promiscuous placing of the sections will provide a roughened section. The sections are preferably strung on a tube, and the latter is tied, which is inflated after a sufficient number of sections have been assembled in tire form, so as to maintain the sections in proper relation when the cover is applied.

The sections are incased by a cover preferably composed of a layer of rubber 6, layers of fabric 7, and outer layer of rubber 8. After the cover is applied to the sections it is vulcanized to bind the tire together. During the vulcanizing process the rubber forming the cover is embedded into the depressions formed by the flutes or roughened edges of the sections, and the latter are prevented from becoming laterally displaced. It is during the process of vulcanizing that the inflated tube primarily performs its mission, in that the sections are held in their related position while the cover is being applied. The flutes or roughened edges may be of such proportions as to cause the cover to be depressed in the depressions in the sections to roughen the outer surface of the tire as shown in Fig. 4.

My invention is simple and durable, the leather or like material being of sufficient stiffness to resist wear, and at the same time yielding tangentially with the resilient cover when a load is applied to the tire. Of course it will be understood that the openings in the sections, and thus the inner tube, may be omitted for particular makes of tires.

What I claim is—

1. A tire composed of a series of transversely arranged sections of non-resilient material having projections and depressions formed on their edges, the projections on the sections being adjacent the depressions on the adjacent sections, a resilient cover incasing the sections and fitting around the projections and in the depressions of the sections, said cover being vulcanized to hold the sections together.

2. A tire composed of a series of transversely arranged sections of relatively non-resilient material formed with projections and depressions on their edges, the projections on the sections being arranged adjacent the extensions on adjacent sections, and a resilient reinforced cover incasing the sections, said cover being vulcanized and extending into the depressions of the said sections.

3. A tire composed of a series of sections formed with projections and depressions on their edges, the projections on the sections being located in line with the depressions on adjacent sections, and a resilient cover incasing the sections, said cover being vulcanized and extending into the depressions of said sections.

4. A tire composed of a series of transversely arranged sections, each sections having a projection on its edge, the projection on each section being located out of alinement with the projection on adjacent sections, and a resilient cover incasing the sections, said cover being vulcanized and the projections on the sections, extending into said cover.

5. A tire composed of a series of transversely arranged sections, each section having a series of projections and depressions, the sections being arranged to dispose the projections and depressions of one section out of alinement with the projections and depressions of the next series of projections and depressions, a resilient cover incasing the sections and fitting around the projections and in the depressions of the sections, said cover being vulcanized to hold the sections together.

6. A tire composed of a series of transversely arranged sections of non-resilient material having projections and depressions formed on their edges, the projections on the sections being adjacent the depressions on the adjacent sections a resilient cover incasing the sections and fitting around the projections and in the depressions of the sections to provide indentations and projections on the outer surface of the casing, said cover being vulcanized to hold the sections together.

In testimony whereof I have signed my name to this specification in the presence of two subscribing witnesses.

ELEAZER KEMPSHALL.

Witnesses:
JNO. IMIRIE,
ALICE H. BENNETT.